Patented Sept. 21, 1926.

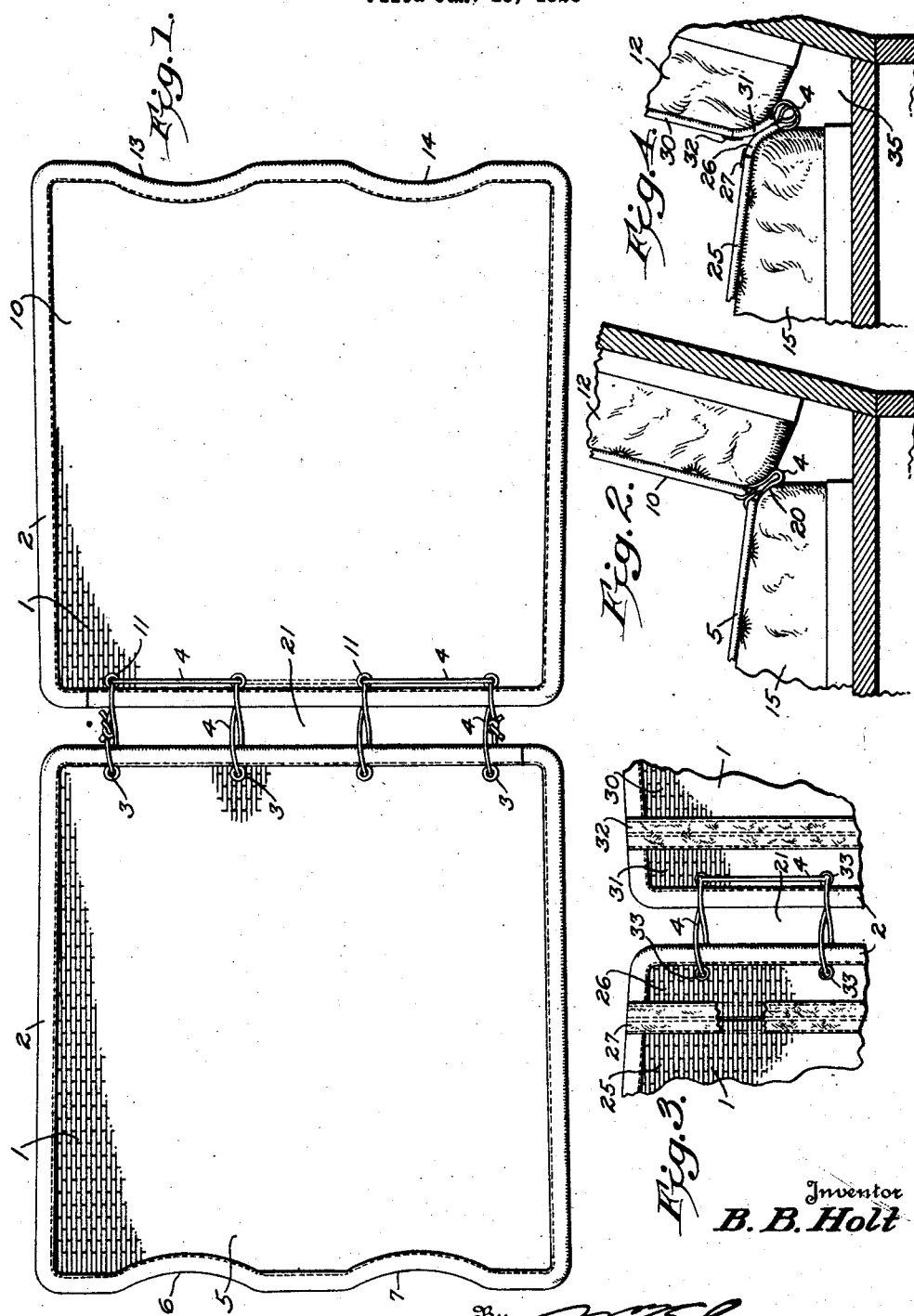

1,600,471

UNITED STATES PATENT OFFICE.

BENTON B. HOLT, OF CENTRAL CITY, KENTUCKY.

COVER FOR VEHICLE SEATS.

Application filed January 19, 1926. Serial No. 82,198.

This invention relates to covers for vehicle seats and has for its object to provide a device more simple in construction and efficient in use than those heretofore proposed.

With these and other objects in view the invention consists in the novel details of construction and combinations of parts as will be more fully hereinafter disclosed and particularly pointed out in the claim.

Referring to the accompanying drawings forming a part of this specification in which like numerals designate like parts in all the views:—

Fig. 1 is a plan view of a device made in accordance with this invention;

Fig. 2 is a sectional view illustrating the invention as applied to the seat of an automobile or other vehicle;

Fig. 3 is a detail plan view partly broken away illustrating a slightly modified form of the invention; and Fig. 4 is a view similar to Fig. 2, illustrating the modified form of the invention as applied to the seat of the vehicle.

1 indicates the body of the cover, which may be made from matting or any other suitable material said body being substantially rectangular in shape and bound around its edges with any suitable binding medium 2 which may be of cloth, rubber, or any material suitable for the purpose and adapted to cover the raw edges of the body portion 1. In spaced relation, and adjacent one of the edges, there are provided a plurality of eyelets 3 adapted to receive the lacing 4 for a purpose presently to be disclosed. These eyelets are disposed along the rear edge of the cover or that edge which normally will be positioned adjacent the back of the seat.

The front edge of the cover, which is generally indicated by the numeral 5, is provided with scooped or cut-away portions 6 and 7 suitably spaced from each other to comfortably fit the bend of the legs behind the knee of the person sitting upon said cover.

Another cover generally indicated by the numeral 10 is provided, likewise made of matting or other material constituting the body portion 1 thereof and whose edges are bound like the cover 5 with a suitable binding 2. Further, this cover 10 is likewise provided with eyelets 11 spaced to correspondingly register with the spacing of the eyelets 3 of the cover 5, said eyelets 11 adapted to receive the lacing 4 so as to secure the cover 5 to the cover 10 which may be considered as a cover for the back cushion 12 of the seat of the vehicle. The back cover 10 is of the same size and shape as the seat cover 5 and is a duplicate in all respects thereof, including the provision of scooped or cut-away portions 13 and 14 spaced as were the cut-away portions 6 and 7 for a purpose which will presently appear.

From the foregoing it will be readily seen that there is provided a cover for vehicle seats comprising a section 5 constituting a cover for the seat cushion 15, and another section 10 comprising a cover for the back cushion 12 of said seat. Further, it will be observed that the sections 5 and 10 are identical in construction and size so that in applying the device of this invention to the seat of the vehicle, it will make no difference whether the section 5 covers the seat cushion 15 or covers the back cushion 12, as in either event the other section 10 will cover the other cushion.

Another feature in providing a cover made in accordance with this invention is that said cover may be used in four different positions. That is to say, the cover may be turned over so that the exposed surfaces of the sections 5 and 10 as seen in said figure will contact with the surfaces of the cushions 15 and 12 respectively, thus giving two positions in which the cover may be utilized. In addition to this the cover may be reversed so that the section 10 will cover the cushion 15 and the section 5 will cover the back cushion 12, thus giving a third way of using the cover. Still a fourth way of using the cover will be to turn the same over so that the exposed surfaces of the sections 10 and 5 will contact with cushions 15 and 12 respectively.

It is well known that covers similar to the one forming the subject matter of this invention have been placed on the market, but the great difficulty experienced with said covers is that they slide or creep over the cushions forming the seat and therefore do not stay in position. This invention, on the other hand, overcomes this difficulty by the employment of the lacing 4 which is made of cotton covered elastic or any other suitable material including rubber tape, which is adapted to stick or otherwise adhere to the seat and back cushions as at 20 in Fig. 2. Further, the sections 5 and 10 are not laced tight together, but are so separated by a space 21 that when the covers are applied to the seat, the loops of the lacing 4 can be shoved between the cushions 15 and 12 so as to be pinched therebetween, thus preventing the sidewise movement of the sections 5 and 10.

In the modified form of the invention illustrated in Figs. 3 and 4 the seat section 25 and the back section 30 differ only from the sections 5 and 10 above disclosed in the portions thereof engaged by the lacing 4. In other words, the sections 25 and 30 are scooped or curved so that the said sections may be reversibly used as covers for the seat cushion 15. In other words, the seat section is cut to provide a wide section 25 and a narrow section 26 secured to the section 25 as by a taped or fabric hinge 27 stitched or otherwise securely fastened to the body 1, and the back section is cut so as to provide a wide section 30 and a narrow section 31 joined to the section 30 as by the fabric hinge 32 the same in all respects to the hinge 27. The two narrow portions 26 and 31 are provided with spaced eyelets 33 the same as the eyelets 3 as above disclosed, to receive the lacing 4 as above described. The outer edges of the sections 25, 26, 30 and 31 are provided with a binding the same as the above described binding 2.

Figure 4 illustrates the method of applying the modified form of cover to a vehicle seat. In said figure it will be seen that the section 25 covering the seat cushion 15 and the section 30 covering the back cushion 12 have their associated sections 26 and 31 pinched between the said cushions (the lacing 4 associated therewith extending beyond the cushions into the space 35) so that said cover is secured against lateral displacement. As in the case of the sections 5 and 10, the sections of the modified form of the invention can likewise be turned over as well as reversed to provide four different positions in which the cover may be used.

From the foregoing it will be readily seen that this invention provides a cover for a vehicle seat having a reversible seat section and a reversible back section which are adapted to be interchanged in that they are both provided with scoops in an edge thereof to fit the bended knee of the occupant of the seat, and that further there is provided a lacing 4 serving as means to secure the seat and back sections together and to the vehicle seat. It will also be observed that the lacing holds the sections in spaced relation so as to provide a free acting hinge as well as to provide a quantity of said lacing to coact with the cushions of the seat against displacement. In the modified form of the invention all of the above is present with the additional feature that there are provided separate portions of the seat and back sections hingedly secured to said sections so that the said sections will the better fit the curved portions of the cushions where said cushions come together.

It is obvious that those skilled in the art may vary the details of construction as well as the arrangements of parts without departing from the spirit of the invention and therefore it is not desired to be limited to the above disclosure except as may be demanded by the claim.

What is claimed is:—

In a cover for a vehicle seat provided with seat and back cushions the combination of a seat section; a back section; separate portions hingedly secured to said seat and back sections; and means comprising a lacing associated with said portions to secure said sections together in spaced relation whereby said portions and lacing will coact with said cushions in aiding to secure said cover against lateral displacement.

In testimony whereof I affix my signature.

BENTON B. HOLT.